Patented Apr. 7, 1925.

1,533,031

UNITED STATES PATENT OFFICE.

JOHAN NICOLAAS ADOLF SAUER, OF AMSTERDAM, NETHERLANDS, ASSIGNOR TO NAAM-LOOZE VENNOOTSCHAP NORIT WITSUIKER MAATSCHAPPIJ (ALSO CALLED NORIT WHITE SUGAR COMPANY), OF AMSTERDAM, NETHERLANDS, A CORPORATION OF THE NETHERLANDS.

PROCESS OF REGENERATING DECOLORIZING CARBON.

No Drawing. Application filed July 26, 1917. Serial No. 182,881.

*To all whom it may concern:*

Be it known that I, JOHAN NICOLAAS ADOLF SAUER, a subject of the Queen of the Netherlands, and resident of 567 Heerengracht, Amsterdam, Netherlands, have invented certain new and useful Improvements in Processes of Regenerating Decolorizing Carbons, of which the following is a specification.

Sugar liquids have been treated with so-called decolorizing carbons for the purpose of purification (in the sense explained below), this purification being carried either to completion or to a desired point, by the aid of the purifying material which is constituted by such decolorizing carbon.

When I speak of "purification" or the "desired purification", this may have reference either to the complete or partial removal of suspended or semi-suspended (colloidal) matter, either organic or inorganic, to insure a clear, bright, or brilliant liquor, or to obtain a liquor which is clearer, brighter, or more brilliant than the original liquor; or to the removal of all or part of the coloring matter to produce a liquor either colorless or at least lighter in color than the original liquor; or to the partial or complete removal of soluble impurities, either organic or inorganic.

The term "purifying material" as used in this specification, is to be understood as referring to a material having one or more of the properties just explained with reference to "purification".

The term "sugar liquids" as employed in this specification, is to be given a broad interpretation, so as to include sugar juices from beets, sugar-cane, or other plants, solutions containing sugar obtained from beets, cane, or other plants, invert sugar from beets, cane, or other plants, or glucose from corn, potatoes, etc.

Decolorizing carbon is a substance usually derived from vegetable material and consisting largely of carbon in an amorphous and therefore highly absorbent condition. Decolorizing carbon is brought on the market in several species and under different names, for instances norit, eponit (or eponite), and noir epure (see U. S. Patents 1,070,654; 1,074,337; 1,176,999; and 1,189,896).

Decolorizing carbon is a general technical name for a special class of carbon with special physical properties and is quite different from ordinary vegetable wood charcoal (woodcarbon or woodchar) or from animal boneblack (animal bonechar), or from blood charcoal, and is much more efficient. Decolorizing carbon is a technically pure amorphous carbon and not a compound of carbon like ordinary wood charcoal. It has a lower specific gravity and a deeper black color than ordinary vegetable wood charcoal. Decolorizing carbon as it is put on the market, contains on 100 dry substance (that is to say, disregarding any moisture contents) about 90% and more of pure carbon.

A typical high-class decolorizing carbon of the kind now obtainable in the market will contain from 8 to 10% of moisture, while the dry substance which forms the remainder of the decolorizing carbon will consist say of 94% of amorphous carbon and 6% ash, this ash consisting mainly of potassium carbonate, calcium phosphate, calcium carbonate, magnesium carbonate, iron phosphate, iron oxid, soluble silica, sand (insoluble silica), traces of copper oxid, chlorine, sodium oxid, etc.

Some hydrogen (about 1.5%) and oxygen (about 2.5%) and to a very small extent also nitrogen (.1%) is present. These substances (hydrogen, oxygen and nitrogen) have to be considered as impurities, and their presence is caused by the technical difficulty of completely carbonizing the vegetable substances which usually form the raw material for the manufacture of decolorizing carbons.

Inferior decolorizing carbons contain from 18 to 60% of ash. High-class decolorizing carbons, such as norit, eponit (or eponite), and noir epure, contain a much smaller proportion of ash.

Substances of animal origin, such as refuse of fish, leather, blood, etc., may also be converted into an amorphous technical pure carbon with a high content of pure carbon by processes like those employed for obtaining decolorizing carbon from substances of vegetable origin, and the product thus obtained from substances of animal origin will have a great absorptive power and therefore a high decolorizing, purifying, and filtering efficiency. I therefore desire it to be understood that the term "decolorizing carbon" as used in this specification and in the claims, is to be interpreted as including products of animal origin as well as those of vegetable origin.

Furthermore, a mixture of decolorizing carbon with any other material not harmful to the intended use is to be included in, and covered by, the appended claims, for the reason that the addition of other material, if indifferent or beneficial in its action, will not be objectionable. As a rule, there will be scarcely any advantage in adding to the decolorizing carbon, any indifferent material, say kieselguhr, for it adds to the bulk of the mass and does not increase either its decolorizing or its filtering or purifying power, and obviously, the same amount (weight or volume) of unmixed decolorizing carbon will be more efficient than a like amount of a mixture containing decolorizing carbon with an addition of indifferent material. The term "indifferent" as used herein, may be defined as designating any material which has no detrimental action in itself and which does not harm or impair the chemical and physical properties of the decolorizing carbon when used in admixture thereto.

When decolorizing carbon is used for the treatment of sugar liquids, as mentioned at the beginning of this specification, or for other purposes, it is found that the efficiency of the absorptive power of this agent or purifying material becomes exhausted after a certain amount of use, and regenerating processes have been employed to restore the spent agent to its original vitality, or at least partly restore its efficiency, so that it may be used again; see, for instance, the four U. S. patents referred to above. My present invention relates to a new, very simple and efficacious process for effecting this regeneration of the spent or exhausted decolorizing carbon.

For this purpose I proceed as follows: Assuming that the decolorizing carbon has been added to a sugar liquid which has been filtered, say through a filter press, or separated in some other way from the purifying material and from the impurities retained thereby, I wash out the sugar in the filter press from the decolorizing carbon, preferably with hot water. The decolorizing carbon thus freed from sugar is then boiled for a prolonged time, say one hour, in a wooden vat provided with a stirrer, using for example, a 2% aqueous solution of hydrochloric acid (or an equivalent amount of other suitable acid). The acid decolorizing carbon paste thus obtained is diluted with a large amount of (preferably hot) water to reduce the acidity, and is then pumped into a filter press or other separating apparatus. The paste retained (say in the filter press) is then washed out with (preferably hot) water, until the mass is neutral, and until practically all soluble substances in the decolorizing carbon paste are washed out. This may reduce the ash content and the content of organic acid compounds to or below the amount contained in the decolorizing carbon originally.

The wet mass may be employed as it is, or it may be dried in any suitable way before use as a purifying agent or material, and is then ready for renewed use.

It will be observed that the regenerating treatment described above does not include any reburning step, and, so far as I am aware, I am the first to devise a regenerating treatment of this character in which the carbon is restored to serviceable condition without reburning.

The decolorizing carbon regenerated in the manner set forth above may be used a number of times, and when its action is no longer satisfactory, it may be subjected again to the special treatment described above. This may be done several times, until the results obtained with the decolorizing carbon regenerated by the acid treatment described above, are below expectation as regards filtration, decolorization, or other purification. When this condition is reached, the acid treatment alone being no longer sufficient to restore the decolorizing carbon to a serviceable condition, I employ a two-stage regenerating treatment instead of the one-stage treatment with acid. One of the stages of this two-stage treatment consists of an acid treatment such as explained above, and the other stage consists of a reburning treatment performed in any well-known or approved manner. The reburning step may follow the acid treatment immediately, or the reburning step may precede the acid treatment in the two-stage regenerating process; the latter procedure is preferable, since the reburning will convert certain organic acid compounds into carbonic acid compounds, which latter are converted by the following acid treatment into soluble compounds and can be washed out readily. The acid treatment is thus more effective if it follows the reburning treatment than if it precedes it. Of course, the two-step regenerating treatment may be repeated if desired. Occasionally, after employing a two-step treatment consisting of an acid treatment followed by reburning, the addition of a third step consisting of another acid treatment is of advantage, especially if the decolorizing carbon is very much contaminated.

In the former patents referred to above, there is a mention of using hydrochloric acid in the regeneration of spent (used)

decolorizing carbon, where the regeneration comprises a treatment with alkalies or alkaline earths preceding the treatment with hydrochloric acid. In these former processes, the manner and purpose of using the hydrochloric acid are quite different from the present case. It is well-known that it takes considerable time to wash away alkalies, and that to reduce the time of washing certain acids may be employed to neutralize the remaining alkalinity, while then the salts which are formed are easily washed out with water. For this purpose only (neutralization) acid was suggested in these earlier patents.

I claim:

1. A process of regenerating decolorizing vegetable carbon which consists of mixing the substantially spent carbon in the condition in which it has been separated from the material being purified, with an acid of strong character, in amount much more than sufficient to neutralize all alkaline-reacting materials therein, and subjecting the mixture to heat sufficient to cause the acid to remove at least the major part of those impurities therein which caused the loss of activity of such decolorizing carbon, and thoroughly washing the decoloring carbon with water.

2. A process which comprises adding to substantially spent decolorizing vegetable carbon, without any previous chemical treatment, and while containing substantially all of the impurities taken up, an excess of hydrochloric acid of about 2% strength, the amount of such acid being far in excess of the alkaline compounds present, boiling, washing out excess acid and reaction products with water, and bringing such treated carbon again into contact with a liquid to be purified.

3. In the art of using decolorizing vegetable carbon as a purifying agent, the steps of alternately subjecting sugar liquors to treatment with such decolorizing vegetable carbon and to the purifying process of claim 1, a plurality of times, and only then treating such decolorizing carbon to a charring temperature and subjecting to an acid treatment and washing.

In testimony whereof I have signed this specification.

JOHAN NICOLAAS ADOLF SAUER.